United States Patent [19]

Fronczak et al.

[11] 4,381,023
[45] Apr. 26, 1983

[54] AUXILIARY TORQUE BACK-UP ROLL

[75] Inventors: Frank J. Fronczak; John F. Hunt, both of Madison, Wis.

[73] Assignee: The United States of America as represented by the Secretary of Agriculture, Washington, D.C.

[21] Appl. No.: 238,401

[22] Filed: Feb. 26, 1981

[51] Int. Cl.³ .............................. B25C 1/00; B27L 5/00
[52] U.S. Cl. ................................ 144/365; 144/209 R; 364/174
[58] Field of Search .............................. 364/478, 174; 144/209 R, 210, 211, 212, 213, 365

[56] References Cited

U.S. PATENT DOCUMENTS 2,884,966  5/1959  Zilm ............................... 144/209 R Primary Examiner—W. D. Bray Attorney, Agent, or Firm—M. Howard Silverstein; David G. McConnell

[57] ABSTRACT

A power back-up roll for a rotary veneer lathe comprises a drive roller for applying a rotational force to the outer periphery of a log axially mounted on the veneer lathe, a controllable drive source for driving the roller and a servo-control system for maintaining the static friction between the roller and the log. In a preferred embodiment of the invention, the servocontrol system includes a first DC-generator tachometer for monitoring the peripheral speed of the log, a second DC-generator tachometer for monitoring the peripheral speed of the roller; and a feedback loop, operatively associated with the controllable drive source as well as the first and second tachometers, for matching the peripheral speed of the roller to that of the log.

10 Claims, 10 Drawing Figures

AUXILIARY TORQUE BACK-UP ROLL

BACKGROUND OF THE INVENTION

1. Field of the Invention

This invention generally relates to a veneer lathe and, more particularly, to an apparatus and method for applying supplemental torque to the outer periphery of a log.

2. Prior Art

Veneer is the most valuable product recovered from wood and, as the price of stumpage rises, the maximum recovery of veneer has become more important. Veneer lathes of the type concerned here axially support a veneer bolt or log utilizing lathe chucks which engage the ends thereof. As the log is rotated about its longitudinal axis, a tangential knife and pressure bar are advanced radially towards the center of the log to cut off a thickness of wood which passes between the cutting edge of the knife and the pressure bar. Generally, the larger the bolt diameter, the greater the torque required for a given cutting force since $T=FL$ where T is torque, F is cutting force and L is the distance between the line of action and the axis about which the wood bolt is turned. Known veneer lathes of the type described above possess certain definite disadvantages, especially with respect to veneer bolt spin-out.

Veneer bolt spin-out occurs when the torque required for cutting exceeds the torque that can be delivered by the chucks that grip the bolt ends. Spin-out can occur at any time during the peeling process; however, it is most likely to occur when the required torque is highest such as at the beginning of the cutting operation when the bolt has its largest diameter or after the transition from outer to inner chucks, since the ability of the inner chucks to transmit torque is significantly less than that of the outer chucks. Since the end result of veneer bolt spin-out is the loss of the bolt as a source of veneer, a solution to this problem would eliminate the significant loss in time and equipment usage already invested in a log that has spun-out.

Because the torque is delivered to the log through the chucks, the logical solution to the problem would be to increase the amount of torque deliverable by optimizing the chuck design. Although the chuck design can be optimized, veneer bolt spin-out remains a problem especially with increased emphasis on peeling to smaller diameter cores, since the diameter of the average bolt has diminished. Further, the short supply of logs is now so serious that a poor quality log, having a softer core, must be used. Therefore, when the strength of the wood is inadequate to provide the required torque necessary to peel the bolt, even an optimally designed chuck will spin-out. Realizing that optimized chuck design cannot provide the ultimate solution to a veneer bolt spin-out, alternative means for providing supplemental torque to the log have been developed.

One approach for providing supplemental torque is through a power back-up roll which engages the peripheral, outer surface of the bolt to apply a rotational force to the bolt. Prior art devices, such as U.S. Pat. No. 2,884,996, are known having power back-up rollers which are installed on existing lathes for bracing the bolt to counteract the resultant force set up by the advancing knife and pressure bar which tends to bend a bolt of relatively small diameter away from the knife. While some existing back-up rolls provide this reaction while maintaining a constant pressure or load on the bolt, the most effective back-up rolls are actually position-controlled rather than load-controlled. In contradistinction, an auxiliary torque back-up roll primarily designed to supply supplemental torque to a bolt requires maximizing the friction and normal force between the bolt and the roll to maximize the transmitted power from the back-up roll to the log. Since the magnitude of the frictional force, and thus the torque that can be transmitted, is proportional to the product of the coefficient of friction and the normal force; it is important to maintain static friction between the power roller and the log surface as well as controlling the normal force between the power roll and the log.

SUMMARY OF THE INVENTION

The principal feature of the present invention is the provision of a totally new approach to applying torque to a veneer bolt, which is now accomplished in the art by means of optimizing chuck design and a myriad of other arrangements adapted to apply supplemental torque to the peripheral surface of a bolt. In accordance with the present invention, a power back-up roll for a rotary veneer lathe comprises a drive roller for applying a rotational force to the outer periphery of a log axially mounted on the veneer lathe; a controllable drive source for driving the roller and an automatic slip prevention means, operatively associated with the controllable drive source for maintaining static friction between the roller and the log.

In a preferred embodiment of the invention, the automatic slip prevention means includes a first DC-generator tachometer for monitoring the peripheral speed of the log, a second DC-generator tachometer for monitoring the peripheral speed of the roller, and an automatic means for matching the peripheral speed of the roller to the peripheral speed of the log.

Another feature of the present invention incorporates in the device a load control arrangement for controlling the normal force between the roller and the log, In another preferred embodiment of the present invention, the static friction between the log and roller is maintained by increasing the normal force between the roller and log to eliminate slippage when the peripheral speed of the roller differs from the peripheral speed of the log.

A further important feature of the present invention is the incorporation of a power back-up roller capable of providing either position control or load control, as appropriate. During the initial peeling phases, it is not necessary to provide position control and, therefore, to maximize torque transmitted from the back-up roll to the log, it is necessary to maximize the normal force between the powered roller and the log surface. Sometime after the outer chucks have been retracted, the log becomes increasingly more flexible and it is desirable to transfer from load control to position control to reduce the deflection of the log and maintain the production of a high quality veneer. In accordance with a preferred embodiment of the invention, maximum torque is applied during the initial veneer peeling cycle utilizing load control by regulating the pressure to a positioning hydraulic cylinder and position control is obtained by controlling the volumetric flow to the cylinder.

The invention is further characterized by the highly desirable feature of being adapted to selectively apply position control or load control, as appropriate, utilizing a pre-programmed process controller or a microprocessor based controller.

A further important feature and a significant advantage of the invention is the compatibility with existing industrial lathes and peripheral equipment.

Another significant advantage of the invention is providing an auxiliary power back-up roll that can be substituted for existing positional back-up rolls utilizing conventional supports.

These and other advantages and features of the invention will be apparent as the following description proceeds with particular reference to the drawings.

DETAILED DESCRIPTION OF THE PREFERRED EMBODIMENTS

Figure 1:
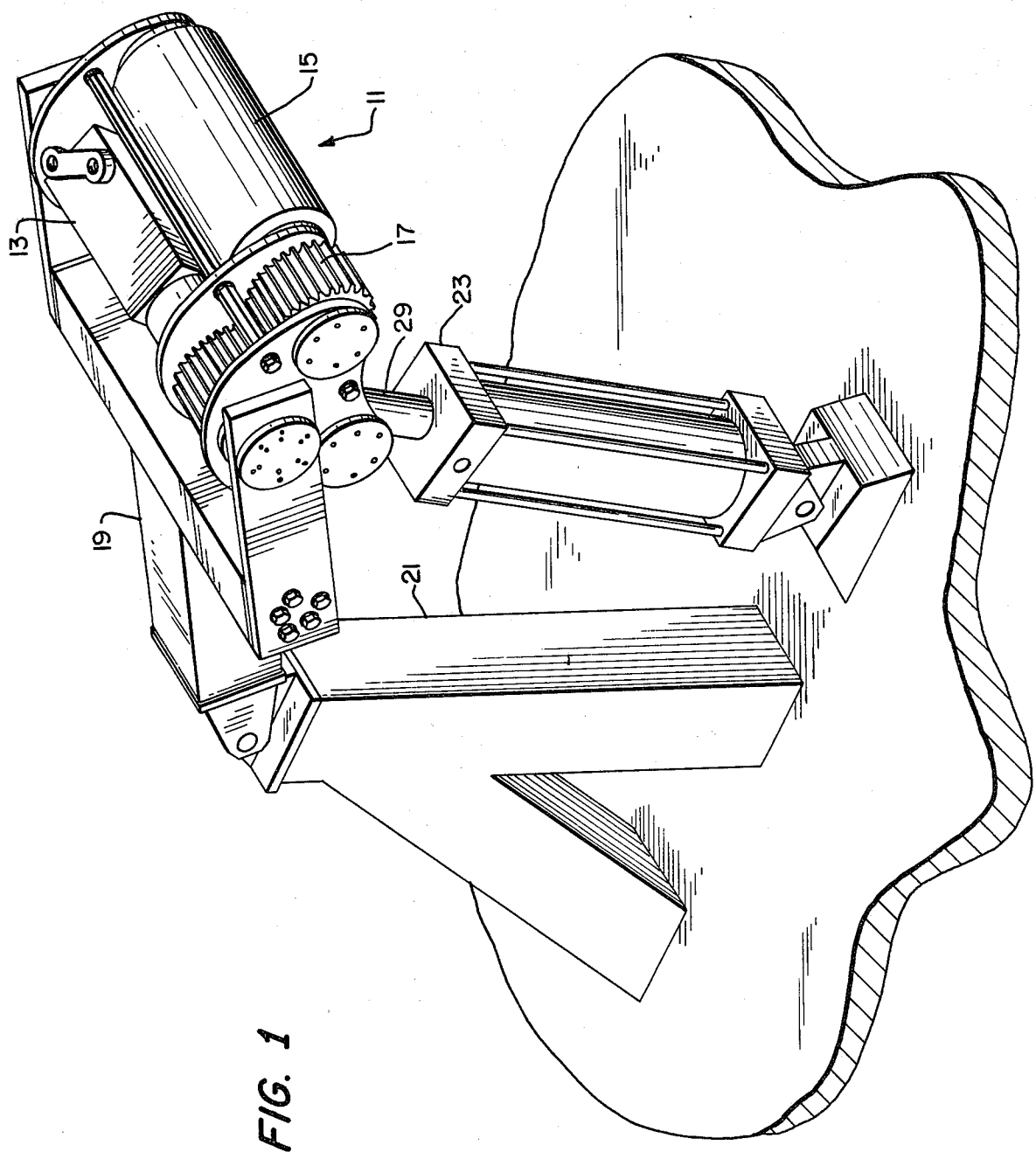
FIG. 1 is a perspective view of the power back-up roller of the present invention.
Figure 2:
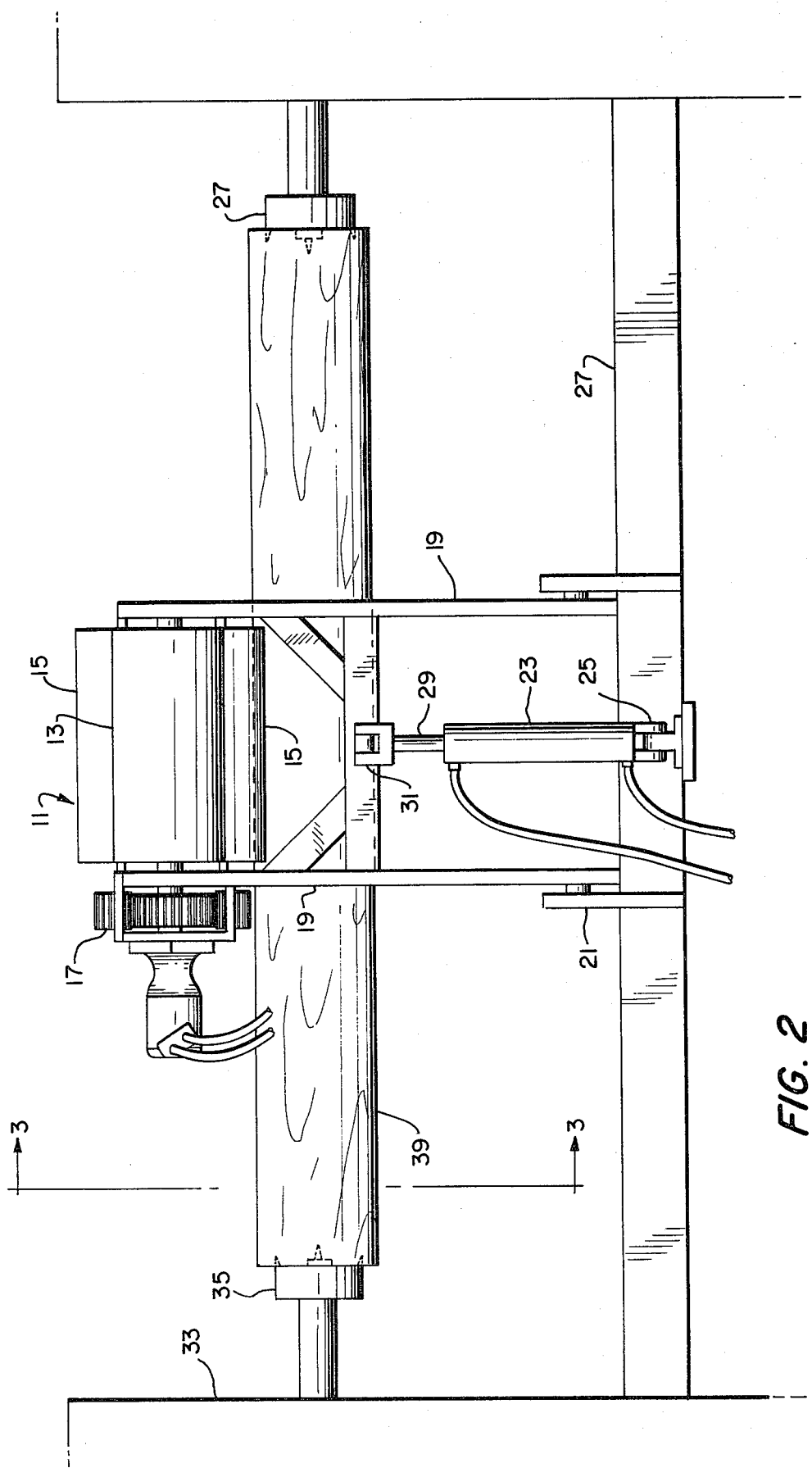
FIG. 2 is a top planer view of the power back-up roller of the present invention attached to a typical veneer lathe.
Figure 3:
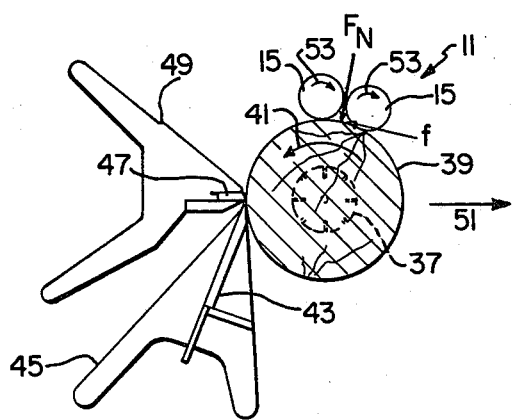
FIG. 3 is a side, schematic view of the present invention in combination with a veneer lathe.

Referring to FIGS. 1, 2 and 3, a power back-up roll is generally indicated at 11 and comprises a relatively low-speed, high-torque motor 13 such as a hydraulic geroller-type motor or the like. The motor 13 is drivably connected to a pair of rollers 15, via two gear trains 17. Each roller 15 can be constructed from tubular steel having a high-friction coating such as the duPont urethane material, ADIPRENE, having a hardness of approximately 80 durometer, A. This coating provides a coefficient of friction of approximately 0.7 to 0.8.

The back-up roll shown in FIG. 1 includes a forked frame carrier 19 pivotally mounted to a single support post 21. Alternatively, the carrier 19 can be pivotally mounted to a pair of supports 21 as shown by FIG. 2. A hydraulic cylinder or ball screw actuator 23 is pivotally connected at 25 to a support 27 and extends inwardly towards the carrier 19 so that a piston rod 29 is pivotally connected at 31 to the carrier 19 providing an arrangement for positioning the back-up roll 11.

As shown in FIG. 2, the back-up roll 11 is typically positioned above a veneer lathe 33. The lathe includes spaced and aligned chucks 35 and 37 which are adapted to grip the ends of a log 39. The back-up roll 11, as illustrated in FIG. 2, does not engage the log 39 and is positioned above and away from log 39 to allow for loading. The chucks 35 and 37 are driven to rotate the log in the direction of arrow 41 shown in FIG. 3.

Referring to FIG. 3, a tangential knife 43 is adjustably mounted in and projects upwardly from a support 45 of the lathe 33. This knife 43 extends the length of the log, and has a cutting edge positioned to engage or cut into the log along the sides thereof, as clearly shown in FIG. 3. A standard pressure bar 47 is adjustably positioned nearby spaced from the cutting edge of the knife 43, the bar being carried by a support 49. The space between the knife 43 and the pressure bar 47 is adjusted in accordance with the thickness of the veneer being cut from the log. A frame (not shown) carrying the knife support 45 and the bar support 49, is advanced towards the axis of the log during rotation of the latter in the usual manner at a predetermined speed. This means that the knife and the pressure bar are advanced in a plane transversely of the log in the direction indicated by arrow 51 in FIG. 3.

Figure 4:
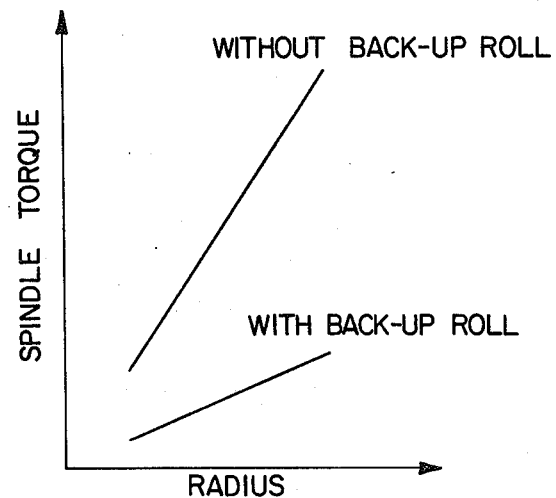
FIG. 4 compares spindle torque with respect to bolt radius for veneer lathes with and without a power back-up roll.

In operation, the back-up roll 11 is positioned above and away from the veneer lathe 33 allowing the log 39 to be supported axially by lathe chucks 33 and 37 engaging the log ends at the centers thereof. Thereafter, the back-up roll 11 is lowered so that rollers 15 engage the outer peripheral surface of the log 39 as illustrated by FIG. 3. Since the distance between the lathe of action and the axis about which the log 39 turns, is greatest at the beginning of the cutting operation, the torque required to cut the veneer from the log 39 is at its maximum. In order to supplement the torque applied to the log 39 by the chucks 35, 37, the rollers 15 are rotated in the direction of arrow 53. Since the log is relatively stiff during the initial peeling process, the normal force Fn between the rollers 15 and the log 39 is controlled by controlling the pressure in the positioning hydraulic cylinder 23. The magnitude of the frictional force, and thus the torque that can be transmitted, is proportional to the product of the coefficient of friction and the normal force. As illustrated in FIG. 4, when applying supplemental torque to the peripheral outer surface of the log 39, the amount of torque supplied by the chucks 35, 37 is significantly less than without a back-up roll.

Sometime after the outer chucks have been retracted, the log becomes increasingly more flexible and it is desirable to transfer from load control to position control to reduce the deflection of the log 39 during peeling. Position control is provided by controlling the volume of oil supplied to the positioning hydraulic cylinder 23. Further, the motor 13 is controlled in a manner which prevents slippage between the rollers 15 and the outer peripheral surface of the log 39. The operation of these control arrangements will be discussed with reference to FIGS. 5 through 8.

Figure 5A:
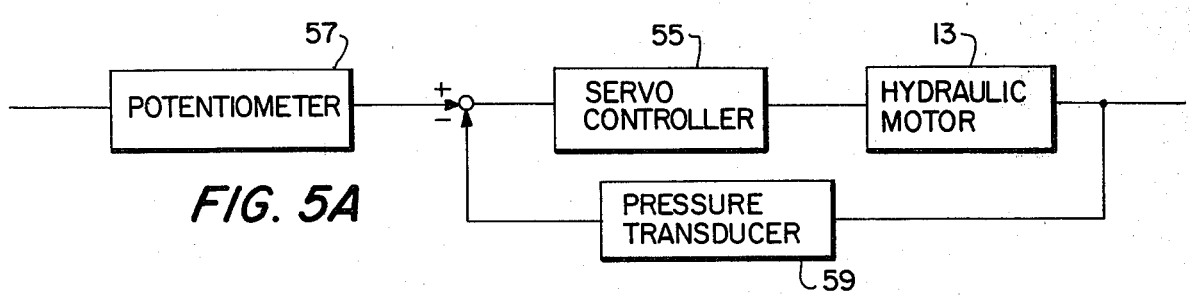
FIGS. 5A–5B illustrate alternative embodiments for providing speed control for the power back-up rolls.
Figure 5B:
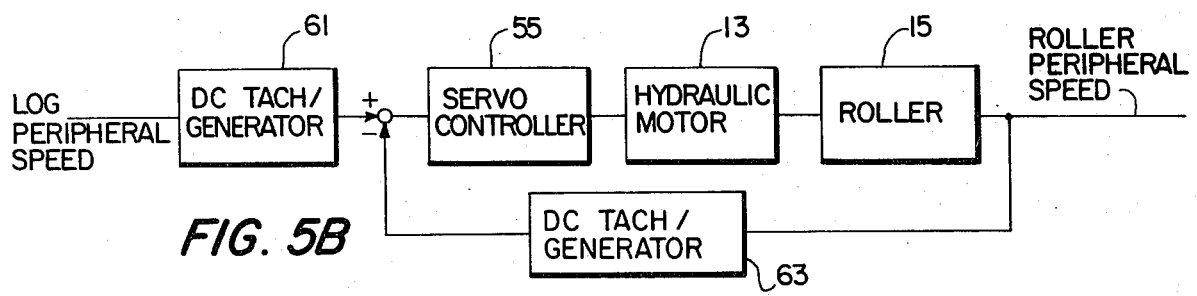

FIGS. 5A and 5B diagrammatically illustrate speed control systems for the motor 13. A power drive pump directs fluid under pressure to a servo-valve which controls the flow rate of oil to the motor 13 under the direction of a servo-controller 35 to control the speed of the rollers 15. In FIG. 5A, the servo-controller 55 receives a command signal from a variable potentiometer 57 which can be manually set to adjust the desired pressure drop across the hydraulic motor 13. A pressure transducer 59 measures the pressure drop across the hydraulic motor 13 to generate a feedback signal to precisely match the pressure of the motor 13 to the command signal generated by the potentiometer 57. Alternatively, a command signal may be generated by a DC-generator tachometer 61 providing a signal indicative of the peripheral speed of the log 39. A feedback signal is generated by a second DC-generator tachometer 63 which measures the peripheral speed of the rollers 15. By comparing the feedback signal to the command signal, the peripheral speed of the rollers 15 is precisely matched to the peripheral speed of the log 39 under the control of the servo-controller 55 to prevent slippage between the roller surface and the log surface thereby maintaining static friction the maximizing transmitted torque. Rather than match the peripheral speed of the rollers 15 with the peripheral speed of the log 39, the arrangement illustrated in FIG. 5B can be utilized to generate a slip signal which is used to increase the normal force between the back-up roll 11 and the log 39 as will be further described hereinafter with reference to FIG. 6B.

Figure 6A:
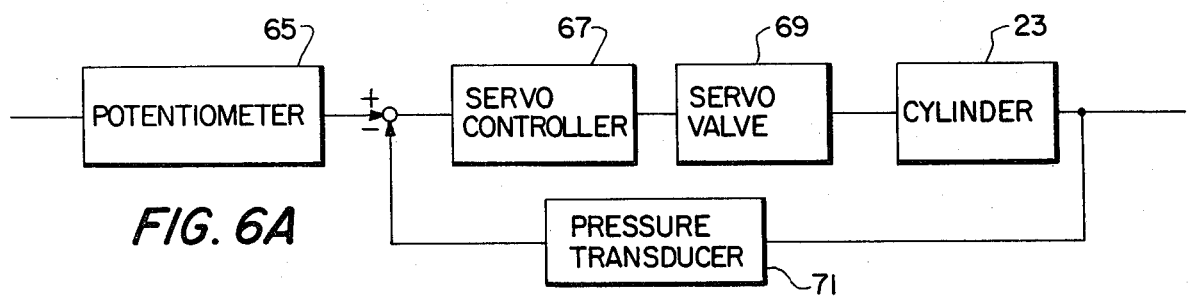
FIGS. 6A–6B illustrate alternative embodiments for providing load control.
Figure 6B:
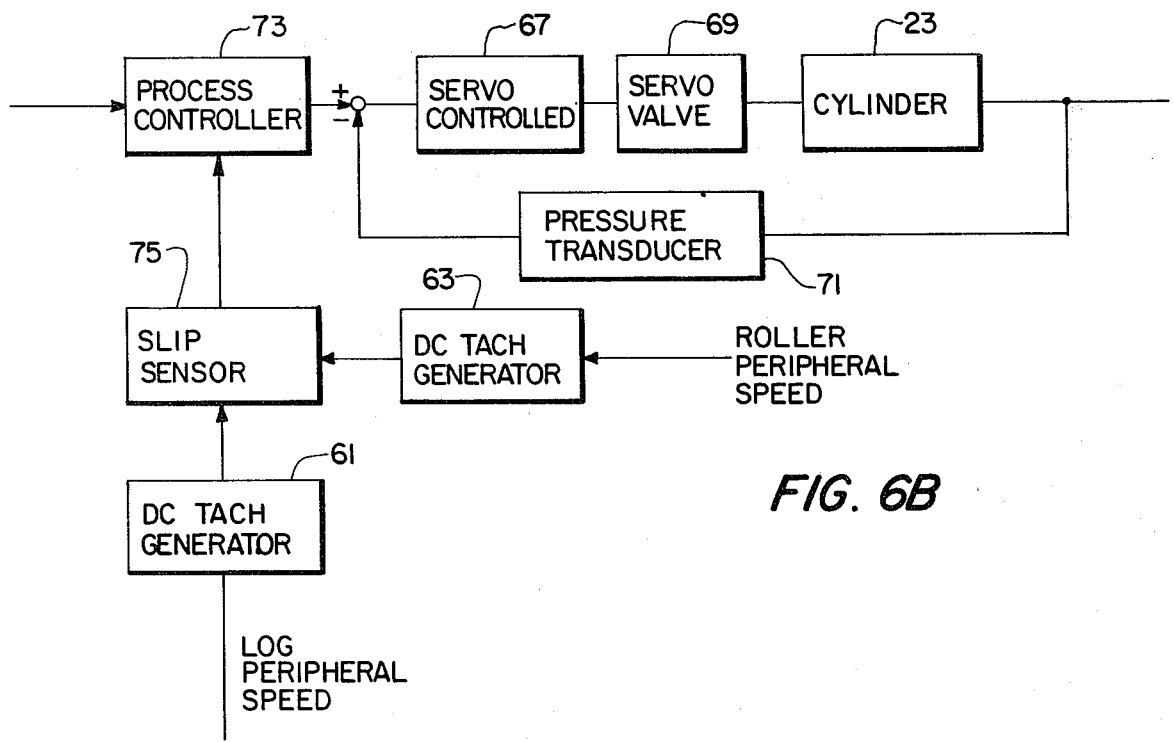

FIG. 6A illustrates an arrangement for controlling the load between the back-up roll 11 and the log 39 by varying the pressure supplied to the positioning hydraulic cylinder 23 utilizing a servo-valve 69 under the control of a servo-controller 67. A variable potentiometer 65, which can be manually set, provides a command signal to the servo-controller 67. A pressure transducer 71 measures the pressure drop across the hydraulic cylinder 23 providing a feedback signal to insure that the pressure delivered to the hydraulic cylinder 23 matches the command signal provided from the potentiometer 65. FIG. 6B illustrates an automatic load control system wherein a pre-programmed process controller or a micro-processor based controller 73 provides a pre-programmed command signal to the servo-controller 67 to automatically set the pressure supplied to the hydraulic cylinder 23. A feedback signal is generated by the pressure transducer 71, as described above, to insure that the pressure supplied to the cylinder 23 matches the command signal from the controller 73. Further, a slip sensor 75, such as a comparator, receives inputs from the log peripheral speed tachometer 61 and the roller peripheral speed tachometer 63 to provide an output signal indicative of the magnitude of slippage when slippage occurs between the rollers 15 and the log 39. When informed of a slip condition, the controller 73 increases the load between the back-up roll 11 and the log 39 or reduces the motor pressure thereby eliminating slip.

Figure 7:
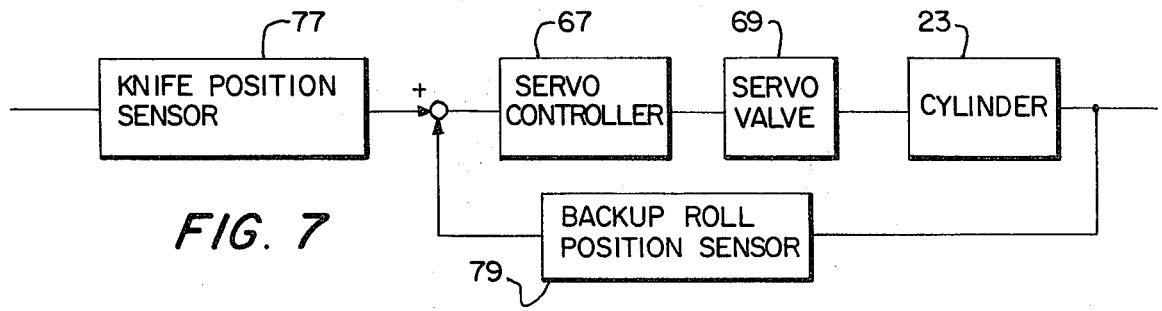
FIG. 7 illustrates an embodiment for providing position control.

FIG. 7 illustrates an arrangement for providing position control to reduce the deflection of the log 39 as it becomes increasingly more flexible during the peeling process. A knife-position sensor 77 indicates the desired position of the back-up roll 11 and provides a signal to the servo-controller 67 to control the volume of hydraulic fluid in the cylinder 23 via the servo-valve 67 previously used in the load control arrangement. A back-up roll position sensor 79, such as a linear variable differential transducer, produces a feedback signal which is compared with the command signal to match the actual position of the back-up roll 11 to the desired position as indicated by the command signal provided by the knife position sensor 77.

Figure 8:
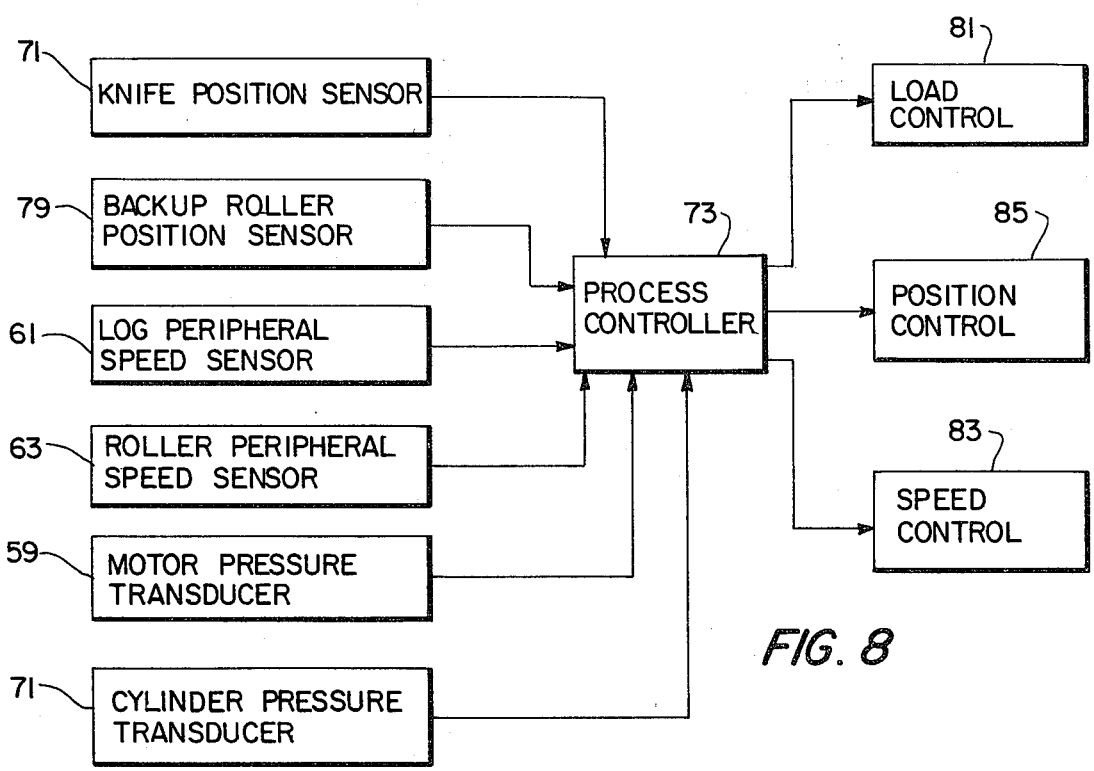
FIG. 8 illustrates an arrangement for providing either load control or position control.

FIG. 8 diagrammatically illustrates an arrangement for automatically controlling the operation of the back-up roller 11 to provide both position control and load control, as appropriate. In this arrangement, the pre-programmed process controller 73 receives inputs from the motor pressure transducer 71, the log peripheral speed sensor 61, the log peripheral speed sensor 63, the cylinder pressure transducer 71, the knife position sensor 77, and the back-up roller position sensor 79. Since the log is relatively stiff at the beginning of the peeling process, the process controller 73 will automatically maximize the friction between the roller surfaces and the surface of the log by activating load control 81 and speed control 83 as previously explained. As the peeling process progresses, the log 39 becomes increasingly more flexible. To measure the deflection of the log, the output of the knife position sensor 77 is compared with the actual position of the back-up roll 11 as indicated by the output signal from the back-up roller position sensor 79. The process controller compares the actual position of the roll 11 with respect to the desired position of the roll 11 as indicated by the output from the knife position sensor 77 and if a significant difference exists, the process controller 73 switches from the load control 81 to the position control 85, thereby providing either load control or position control, as appropriate.

While the invention has been particularly shown and described with reference to use of a hydraulic positioning cylinder 23, it will be understood by those skilled in the art that a hybrid mechanical-hydraulic system could be utilized by substituting a ball screw actuator in place of the hydraulic cylinder 23. Additionally, various changes in form and detail may be made with respect to the invention without departing from the spirit and scope of the invention as defined by the appended claims.

What is claimed is:

1. A power back-up roll for a rotary veneer lathe comprising:
   a drive roller for applying a rotational force to the outer periphery of a log axially mounted on the rotary veneer lathe;
   a controllable drive source for driving said roller;
   a means connected to said roller for maintaining static friction between said roller and the log;
   a first detector means communicating with the log for determining the peripheral speed of said log;
   a second detector means communicating with the drive roller for determining the peripheral speed of said roller;
   a matching means operatively associated with said first and second means and said drive source for matching the peripheral speed of said roller to that of said log; and
   a load control means operative associated with said roller for controlling the normal force between said roller and said log.

2. A power back-up roll as recited in claim 1 wherein said first detector comprises a first DC-generator tachometer and second detector means comprises a second DC-generator tachometer.

3. A power back-up roll as recited in claim 2 wherein said matching means comprises a comparator, operatively associated with said first and second tachometer, for indicating the magnitude of slippage when the peripheral speed of said roller and said log differ, and said load control means being responsive to the output from said comparator to increase the normal force between said roller and said log until the slippage is eliminated.

4. A power back-up roll as recited in claim 2 or 3, further comprising:
   position control means for controlling the position between said roller and a knife edge of the veneer lathe.

5. A power back-up roll as recited in claim 4, further comprising:
   process control means for selectively applying one of said position control means and said load control means.

6. A power back-up roll as recited in claim 5, wherein said roller comprises:
   a pair of driven rollers operatively connected to said source and having a log contacting surface including a high friction coating.

7. A power back-up roll for a rotary veneer lathe comprising:

a pair of drive rollers for applying a rotational force to the outer periphery of a log;

a controllable drive source for driving said rollers;

a hydraulic cylinder connected to said rollers for positioning said rollers with respect to the log;

load control means operatively associated with said cylinder for controlling the normal force between said rollers and the log by regulating the pressure in said cylinder;

position control means operatively associated with said cylinder for controlling the position of said rollers with respect to a knife edge of the lathe by controlling the volumeteric flow to said cylinder;

a first DC-generator tachometer communicating with said log for monitoring the peripheral speed of the log;

a second DC-generator tachometer communicating with said rollers for monitoring the peripheral speed of said rollers;

a feedback loop, operatively associated with said load control means, said controllable drive source and said first and second tachometers, for matching the peripheral speed of said rollers to the peripheral speed of the log; and process control means operatively associated with said position control means and with said load control means for selectively applying one of said position control means and said load control means.

8. A method for applying supplemental torque to a log axially mounted on a rotary veneer lathe, the method comprising the steps of:

applying a rotational force to the outer periphery of a log utilizing a drive roller;

controlling the normal force between the roller and the log;

determining when slippage exists between the log and and the roller; and increasing the normal force between the log and roller until the slippage is eliminated.

9. A method as recited in claim 8 further comprising the step of:

maintaining static friction between the roller and the log utilizing a servo-control system for matching the peripheral speed of the roller to the log.

10. A method as recited in claim 8 or 9, further comprising the steps of:

(a) determining the position of a veneer lathe knife edge;

(b) determining the position of the roller with respect to the knife edge;

(c) determining the optimum position of the roller with respect to the knife edge; and matching the actual position of the roller with the optimum position of the roller with respect to the knife edge.

* * * * *